United States Patent Office 3,442,198
Patented May 6, 1969

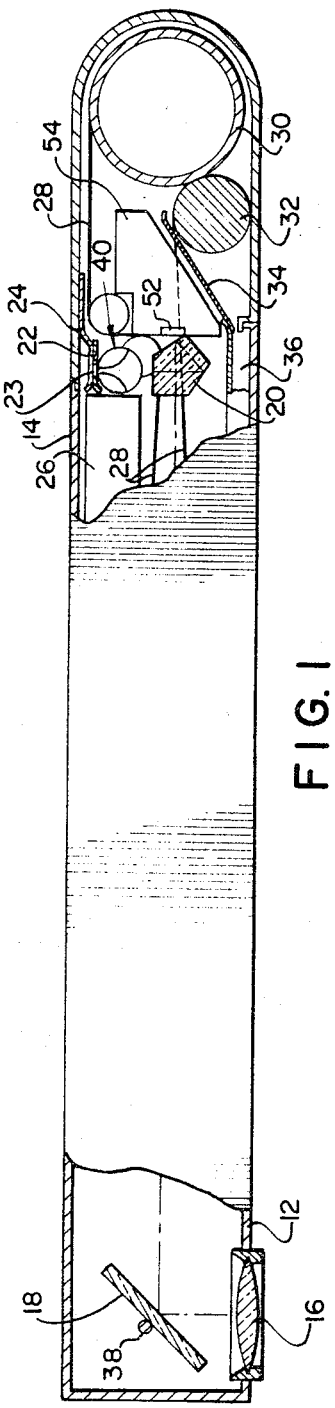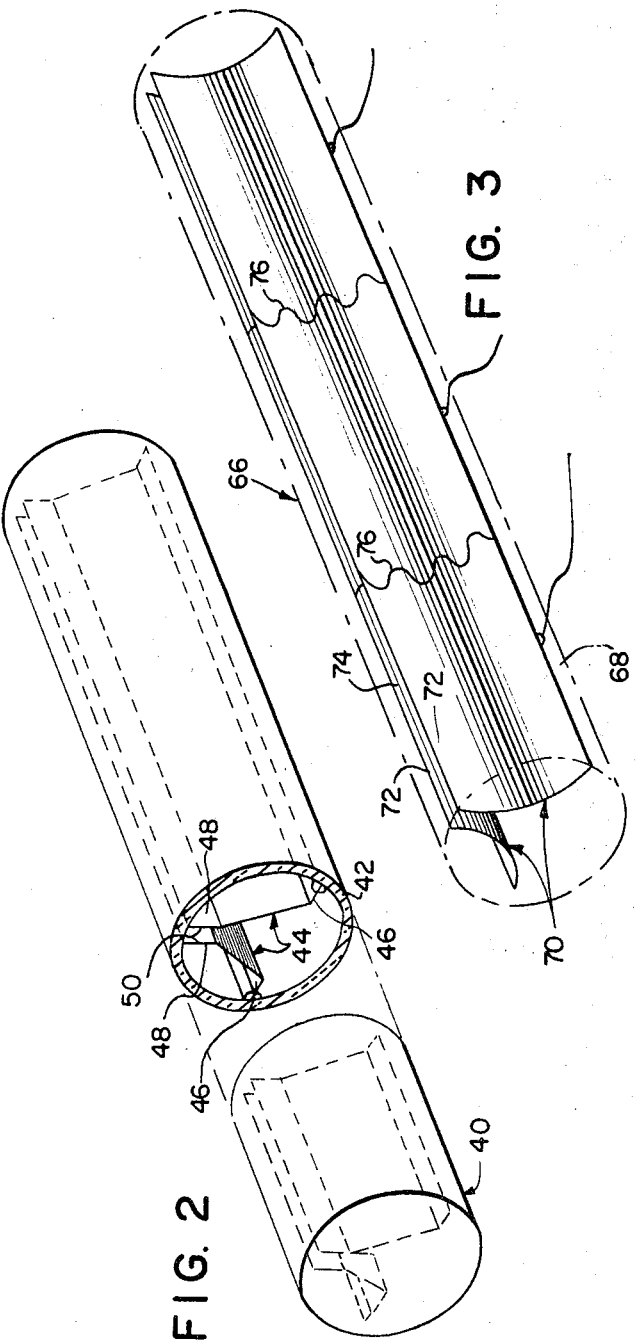

---

3,442,198
EXPOSURE CONTROL SYSTEM
Conrad H. Biber, Needham, Mass., assignor to Polaroid Corporation, Cambridge, Mass., a corporation of Delaware
Filed Dec. 23, 1966, Ser. No. 604,425
Int. Cl. G03b 9/02
U.S. Cl. 95—64        6 Claims

ABSTRACT OF THE DISCLOSURE

An exposure system for a camera in which exposures are made by moving an aperture and a photosensitive recording medium relative to one another and the duration of exposure is a function of the width of the aperture. The exposure system includes a relatively narrow elongated aperture constructed to provide for rapid changes in width during exposure of an area of the recording medium to form an image therein and a photoelectric control system for rapidly varying the width of the aperture as a function of light incident on the aperture. Aperture structures and control systems are disclosed for differentially varying the widths of a plurality of zones of the aperture.

---

In the copending U.S. patent application of Edwin H. Land, Ser. No. 604,318, filed on an even date herewith, there is shown and described a camera including an optical system for forming an image at a surface and an exposure control system comprising a relatively narrow aperture located near the surface, means for locating at least a portion of a light-sensitive image-recording medium at the surface in position for exposure to light transmitted by the aperture, means for moving the aperture and recording medium relative to one another to record the image in the recording medium and photoresponsive means for changing a parameter of the aperture as a function of the intensity of light incident on the aperture to vary the light energy transmitted by the aperture. The aperture, in combination with the means for causing relative movement of the aperture and recording medium, functions in the nature of a focal plane shutter to effectively control the duration of exposure by varying the width of the aperture, i.e., the dimension of the aperture extending in the direction of relative movement. In the camera shown and described, the aperture is held stationary and the film and image are moved at the same speed relative to the aperture so as to scan the image from one side to the other while holding the image and recording medium stationary with respect to one another.

The foregoing application recognizes that exposures made at a particular aperture (lens) stop and duration (shutter speed) may produce a proper exposure for only a portion of the subject or scene with other parts of the subject being improperly exposed, particularly if the brightness scale of the subject exceeds the useful exposure scale of the recording medium, and suggests a novel system in which improved exposures are obtained by adjusting the exposure to suit the brightness of each incremental portion of the scene as that portion is being recorded. The application proposes, for the first time, an exposure system which, in effect, compresses the brightness scale of the subject by minimizing fluctuations in the light energy transmitted by the shutter aperture during an exposure and thereby reduces the brightness scale of the subject more closely to the useful exposure scale of the recording medium.

One parameter of the aperture that can be varied to minimize fluctuations in the light energy transmitted by the aperture during exposure is the width of the aperture. Varying the aperture width uniformly from end to end of the aperture will, in effect, result in compression of the scene brightness scale in a single dimension or direction. However, the brightness scale of the scene actually varies in two dimensions, so that in order to produce the optimum exposure, an aperture comprising a plurality of contiguous zones is constructed to permit adjustment of the width of each individual zone as a function of the intensity of light incident on the particular zone while also providing for a gradual transition between the widths of adjacent zones of the aperture.

Objects of the present invention are: to provide an aperture structure and a photoresponsive control system therefor, having an extremely short response time, that is, an aperture and control system capable of effecting extremely rapid changes in aperture width during an exposure; and to provide an aperture and control system having the capability of differentially varying the width of the aperture in a plurality of contiguous zones thereof.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIGURE 1 is an elevational view, partially in section, of a camera incorporating the invention;

FIG. 2 is a somewhat schematic, perspective view, partially in section, showing means providing an aperture constructed in accordance with the invention;

FIG. 3 is a view similar to FIG. 2 illustrating another embodiment of the invention;

Figure 4:
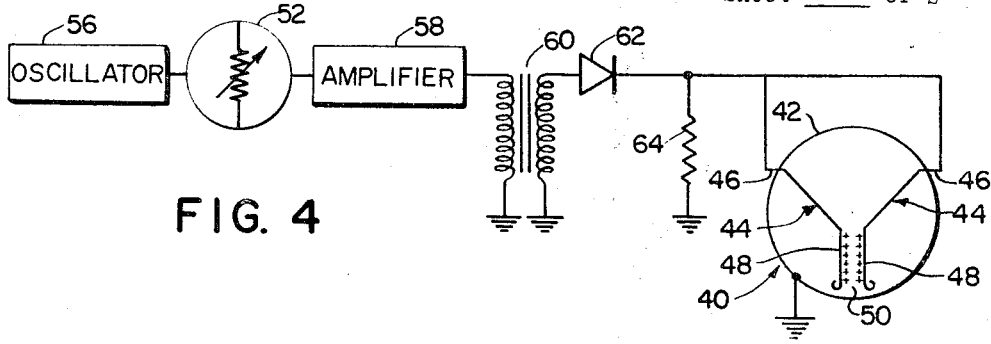
FIG. 4 is a circuit diagram of an aperture control system.

Reference is made to FIGURE 1 of the drawings wherein there is illustrated a camera of the type shown and described in the U.S. patent application of Robert L. Norton, Ser. No. 604,304, filed on an even date herewith, and incorporating the aperture and aperture control system of the present invention. The camera, designated 10, comprises an elongated housing for mounting and enclosing the components of the camera and including a forward wall 12 and a rear wall 14. The camera comprises an image-forming optical system shown as including a conventional objective lens 16 mounted on forward wall 12 near one end of the housing; a mirror 18 mounted behind lens 16 for directing light from the lens toward the opposite end of the housing; a pentaprism 20 mounted toward the opposite end of the housing from mirror 18 between the forward and rear walls for reflecting light transmitted by the lens and reflected by mirror 18 toward the rear of the camera housing. Mirror 18 and pentaprism 20 provide an optical path of predetermined length such that lens 16 forms an image at an image plane located within the camera housing generally parallel and adjacent rear wall 14. As a means for supporting an image-recording medium at this image plane, there is provided a guide plate 22 mounted adjacent rear wall 14 with its rear surface located substantially at the focal surface (i.e., image plane) of lens 16. Guide plate 22 is formed with an aperture 23 for transmitting light from pentaprism 20 to an image-recording medium supported against the rear surface of guide plate 22 and a spring 24 is provided for supporting the image-recording medium against the rear surface of guide plate 22 across aperture 23 in the guide plate.

The image-recording medium employed in the camera shown is preferably in the form of a sheet material initially supplied in a magazine or container 26 mounted within the camera housing near rear wall 14 and guide plate 22. Container 26 may comprise a component of a film pack of the type shown and described in the copending U.S. patent application of Robert L. Norton et al., Ser. No. 604,340, filed on an even date herewith, and includes an opening aligned with the space between guide plate 22 and spring 24 through which successive film units, each comprising a photosensitive image-recording medium, may be advanced from the magazine between the guide plate and spring. The camera includes a film transport system and means for processing each film unit following exposure of the recording medium thereof comprising an endless belt 28 for advancing the leading end portion of each film unit from magazine 26 across support plate 22 between the latter and spring 24 where the film unit is again engaged by belt 28 and advanced around and between a pair of pressure-applying members in the form of a juxtaposed cylinder 30 and roll 32 and thence into engagement with a guide plate 34 which guides the film unit into a processing chamber 36. The image-recording medium is exposed during movement across aperture 23 between the guide plate and spring and is preferably processed by a viscous processing liquid distributed in contact with the recording medium during movement thereof between cylinder 30 and roll 32.

In the camera shown, the photosensitive image-recording medium, e.g., a sheet, is exposed to produce an image of a scene therein by moving the sheet in an exposure or image plane past a relatively narrow aperture termed a "shutter" aperture extending transversely of the direction of movement of the sheet from side to side of the area of the sheet to be exposed. An image of the scene is formed at the exposure plane by lens 16 and is moved in the same direction and at the same speed as the image-recording sheet so as to scan a relatively narrow incremental area of the scene extending from one side of the scene to the other. A variety of structures are possible for moving the image formed by lens 16 at the same speed as the recording medium in order to retain the image and recording medium stationary with respect to one another during an exposure and in the form shown, these means include a pivotable shaft 38 for supporting mirror 18 and means (not shown) for pivoting the shaft and mirror in a manner providing for movement of the image formed by lens 16 at the rear surface of support plate 22 at the same speed and in the same direction as the image-recording medium during exposure thereof.

The duration of exposure of any incremental area of the recording medium is a function of the aperture width and the speed of movement of the recording medium past the aperture. The total time required to make an exposure is a function of the length of the image being recorded and the speed of movement of the recording medium (and image) relative to and past the aperture. For example, an area of an image-recording medium three inches in length may be subjected to an exposure of $\frac{1}{60}$ second by moving the image-recording medium and image relative to and past an aperture having a width of 0.15 inch at a rate of nine inches per second with the total time required for exposure being $\frac{1}{3}$ second. It will be apparent from the foregoing example that the image recorded in a third of a second may comprise 20 incremental areas so that if the aperture width were to be varied for exposure of each incremental area, the aperture would be required to have the capability of changing its width at the rate of 60 times per second or, stated differently, the aperture would be required to exhibit a response time not exceeding $\frac{1}{60}$ of a second.

Not only must the structure defining the aperture itself provide for an extremely short response time, but the control system, which senses the intensity of light incident on the aperture and varies the width of the aperture as a function of the light intensity, must also have an extremely short response time such that the overall response time of the aperture and control system is within a predetermined limit such as $\frac{1}{60}$ second. The present invention comprehends the use of an electrostatic transducer as the fast response, variable width aperture and a photoelectric control system for driving the electrostatic transducer to vary the width of the aperture in inverse proportion to the intensity of light incident on the aperture.

An electrostatic transducer or aperture constructed in accordance with the invention is illustrated in detail in FIG. 2. This aperture or transducer is generally designated 40 and is designed to be located in the camera of FIGURE 1 between pentaprism 20 and guide plate 22 as close as possible to the guide plate so that the variable width shutter aperture provided by transducer 40 is located closely adjacent the focal plane of lens 16 and in alignment with aperture 23; the latter being substantially wider than the greatest width of the shutter aperture so that exposures are determined by the shutter aperture and not by aperture 23. Transducer 40, in the form shown in FIG. 2, comprises an elongated cylindrical tube 42 sealed at its ends and containing an aperture of predetermined composition and pressure. Tube 42 is formed of a light-transmitting material such as glass with a uniform wall thickness at least in regions of the tube walls through which light passes so as not to have any lens power and is at least equal in length to the width of the image to be recorded in the recording medium. Mounted within the tube are a pair of elongated light opaque membranes 44 each formed of a very thin, resilient, conductive material and having a generally U- or V-shaped cross section. Membranes 44 are mounted within tube 42 so as to extend from end to end of the tube and each membrane has a length at least equal to the width of the image to be recorded and a longitudinal edge portion 46 at which the membrane is mounted on the wall of tube 42 opposite the other membrane. The membranes include medial portions extending inwardly toward one another and longitudinal edge portions 48 disposed in juxtaposition with one another near the wall of tube 42 and cooperating to define an elongated shutter aperture designated 50. Longitudinal edge portions 48 are preferably located in parallel relation and spaced from one another by a distance equal to the minimum width of the exposure aperture and since the membranes 44 are formed of a resilient material, the aperture 50 defined by edge portions 48 of the membranes will return to its narrowest width when the force which causes the membranes to separate and widen the aperture is removed. Alternatively, the longitudinal edge portions 48 of the membranes may be initially spaced from one another by the maximum width of the exposure aperture and a force applied to the membranes to narrow the width of the aperture which, in the relaxed position of the membranes, will be at its widest.

Membranes 44 are formed of a material capable of conducting and supporting an electrostatic charge which, according to the invention, is the biasing force employed to change the spacing between longitudinal edge portions 48 of the membranes; and should be sufficiently resilient to function as a spring having a predictable, if not constant, rate over the range of deflection of longitudinal edge portions 48 during variation of the aperture width. The width of aperture 50 defined by edge portions 48 is varied by generating electrostatic charges on the edge portion which either repel or attract one another to deflect the edge portions away from or toward one another. Materials suggested for the membranes include thin resilient conductors such as gold foil (e.g., gold foil having a thickness of the order of $10^{-4}$ inch) or laminates such as vacuum metalized polymeric films, for example, polytetrafluoroethylene or polyethylene terephthalate, coated with a thin layer of a light opaque electrically conductive material such as aluminum formed by vacuum deposition, or black, non-reflecting conductive materials such as carbon and molybdenum. The materials suggested by way of example are proposed for their mechanical strength, stability and resilience as well as their dielectric properties, the significance of which will appear more fully hereinafter.

A photoresponsive control circuit for sensing the intensity of light incident on aperture 50 and rapidly varying the width of the aperture in inverse proportion to the light intensity so as to reduce the fluctuations in light energy transmitted by the aperture during an exposure is illustrated in FIGS. 1 and 4. The control circuit includes an electrical element having a parameter such as resistance which varies as a function of the intensity of light incident thereon and is illustrated as a light-responsive resistor 52 although other photoresponsive elements such as photodiodes and phototransistors may be employed. Resistor 52 is positioned behind the first reflecting surface of pentaprism 20 in the path of light from mirror 18 and the first reflecting surface is only partially reflective so as to transmit a portion of the incident light to light-responsive resistor 52 while redirecting the major portion of the light toward the second reflecting surface of the prism and thence toward aperture 50. Thus, the optical system and the light-responsive resistor are constructed and positioned to provide for directly sensing and measuring the intensity of the light incident on aperture 50. This intensity bears a fixed relationship to the intensity of the light passed by the first reflecting surface of the pentaprism and incident on the light responsive resistor.

The control system is shown diagrammatically and designated 54 in FIGURE 1 and, as shown in FIG. 4, includes an oscillator 56 for supplying high-frequency current to light-responsive resistor 52 which varies the potential of the output of the oscillator in a predetermined relation to the intensity of light incident on the resistor. In the form of aperture and control system shown, the width of aperture 50 defined by edge portions 48 is varied by generating electrostatic charges of the same sign on edge portions 48 tending to repel one another and separate the edge portions so that the width of aperture 50 is directly related to the potential or surface density of the electrostatic charges on longitudinal portions 48 and is inversely related to the spring constant of membranes 44. In the control circuit shown, light-responsive resistor 52 may be a photoconductor having a resistance which varies in direct relation to the intensity of incident light.

The control circuit includes an amplifier 58 for amplifying the signal from light responsive resistor 52 and a transformer 60, the primary of which is coupled with the output of the amplifier. The secondary of transformer 60 is coupled through a rectifier shown as a diode 62 to membranes 44 to produce charges of the same sign on the membrane. Tube 42, in the preferred from, contains a gas providing an atmosphere that is slightly conductive and is electrically grounded to provide a reference potential for the charge on membranes 44. Gases proposed as the atmosphere within tube 42 include, for example, dry nitrogen or oxygen together with a minute amount of water vapor to provide a slightly conductive atmosphere. Since variation in the aperture width requires movement of edge portions 48 toward and away from one another, one of the factors increasing the response time by offering resistance of motion to the edge portions is the gas comprising the atmosphere in which the membranes are contained. Although the motion required is quite small being equal to one half of the change in aperture width, resistance of the gas to the motion of the membranes and the response time of the aperture is minimized if the density of the gas within tube 42 is reduced to the minimum necessary to provide the requisite electrical conductivity. This may be accomplished by maintaining the atmosphere within the tube at a pressure substantially below ambient pressure.

The response time of the aperture is also a function of the rate of change in the surface density of the electrostatic charges on edge portions 48 of the membranes including specifically the rate at which the charge, indicated as a positive charge, is reduced to reduce the width of the aperture. In order to bleed the charge from the membranes, the membranes are coupled to ground through a resistor 64, the characteristics of which determine the rate at which the charge on the membranes is reduced while also establishing a potential difference between the membranes and ground potential. For example, an aperture-providing transducer formed of a membrane having a thickness of the order of $10^{-4}$ inch and having an electrical resistance of the order of $10^5$ ohms per centimeter and a capacitance of the order of $10^{-10}$ farads, may be operated at a potential on the order of 10 to 20 kv. with a control circuit including a bleed resistor 64 having a value of the order of $10^6$ ohms providing a $10^{-4}$ second time constant for the RC circuit comprising resistor 64 and the capacitor defined by membranes 44. The longitudinal edges of edge portions 48 may be rolled as shown in FIG. 4 in order to more uniformly distribute the charges on edge portions 48 and prevent corona discharge across the aperture at the edges.

The aperture structure shown in FIG. 2 provides for a substantially uniform variation in the width of the aperture throughout the length of the aperture, however, as previously noted, it may be desirable to divide the aperture into a plurality of contiguous zones and vary the width of each zone in relation to the intensity of light incident on that particular zone. This latter construction may be preferred to varying the aperture width uniformly throughout the length of the aperture because it results, in effect, in a two-dimensional compression of the brightness scale of the scene whereas uniform control over aperture width results in compression of the scene brightness scale only in the direction of movement of the film. However, it should be noted that insofar as the photoresponsive control system senses and integrates the light intensities over the entire aperture and controls the aperture width in accordance with the average intensity of light throughout the length of the aperture, there is a two-dimensional compression of the scene brightness. It should be apparent that the direction in which the brightness scale of the scene should be compressed is perpendicular to the direction of motion of the recording medium and varying aperture width uniformly throughout the length of the aperture will be substantially less effective to compress scene brightness scale than varying the aperture width in a plurality of zones of the aperture. With this latter construction, it is possible to reduce the light transmittance of the portion of the aperture through which the brighter portion of the scene (e.g., the sky) is recorded and increase the light transmittance of the zone of the aperture through which less bright portions of the scene (e.g., subjects in the foreground) are recorded. It should also be apparent that increasing the number of individually controllable zones into which the aperture is divided will make possible an increase in the extent to which the brightness scale of the scene can be compressed. However, varying the width from zone to zone of the aperture raises another problem, specifically, making the transitions between zones of differing width so gradual that the difference does not appear visible to the observer of the visible image. Abrupt changes in aperture width or transmittance will result in the appearance of parallel bands or stripes of different overall density extending in the direction of motion of the recording medium and apparent to the observer whereas gradual transitions may result in measurable differences in density between parallel zones of the visible image but these differences will not be noticed by the observer and the image will appear as a high-quality image containing more information than one in which the brightness scale of the subject was not compressed, with the slope of each edge of the aperture between zones of different widths representing the controlling gradient.

The maximum slope of the edge of the aperture—which determines light transmittance gradient—is best determined empirically since it is dependent upon a number of subjective factors including the nature of the photographic medium, i.e., color or black-and-white, the composition of the scene, the extent of the brightness scale of the scene, the criticality of the viewer, the manner in which the visible image is viewed and the nature and character of the finished photograph. Another factor determinative of the slope of the transition gradient between zones is the number and width of aperture zones. Obviously for a given percentage change in light transmittance or aperture width, i.e., the ratio of change in aperture width to maximum width of an aperture of given length, an increase in the number of zones will result in an increase in the slope of the transition gradient between zones. It should be apparent, therefore, that in the design of a particular aperture, considerations as to the percentage variation in aperture light transmittance or width and the number of zones will represent a compromise between obtaining the largest scene brightness scale compression capability, which may be expressed as the largest percentage light transmittance variance, in order to record more information that otherwise lies outside of the exposure range of the image-recording medium; and providing for compressing the scene brightness scale in the maximum number of regions of the scene in order to produce a photograph containing information about a greater number of regions of the scene than would otherwise be possible.

Reference is now made to FIG. 3 of the drawings wherein there is illustrated a transducer providing an aperture similar in construction and operation to the transducer shown in FIG. 2 and providing an aperture divided into three contiguous zones, the widths of which are subject to independent control. This transducer, designated 66, comprises a cylindrical tube 68 having substantially the same construction as tube 42 and providing an atmosphere of substantially the same composition and density; and a pair of thin membranes 70 having curved or U-shaped cross sections mounted on the tube at one longitudinal edge with their opposite longitudinal edge portions designated 72 disposed in face-to-face relation to define a narrow elongated aperture designated 74. Each membrane 70 is preferably formed of a dielectric film with a conductive coating and is divided into three zones by interrupting the conductive coating along transverse portions of the membrane. The conductive coatings are interrupted by narrow regions shown as sinusoidal-shaped lines 76 having widths determined in accordance with considerations which will be discussed hereinafter. The material comprising the dielectric films may itself be light opaque and/or the conductive coating may be light opaque. In a membrane structure in which the conductive coating, e.g., vacuum deposited aluminum, provides the requisite light opacity, a non-coated region extending in the direction of motion of the recording medium might be recorded as a narrow line. Recording of these regions may be avoided by providing an opaque, non-conductive coating in these regions or, as shown, lines 76 may be sinusoidal in form, this latter construction also has the advantage of reducing the width gradient between adjacent zones. Lines 76 may take other configurations which will not be recorded as lines so long as they do not extend parallel with the direction of motion of the recording medium relative to the aperture.

The separate photoresponsive control circuit including a light responsive resistor located behind the first reflecting surface of pentaprism 20 is provided for controlling the charge, and hence width, of each of the three zones of the aperture. The gradient between zones can be limited in a number of ways. There is first of all the physical linkage between zones defined by electrically separated conductive regions carried on a single, integral support. Secondly, the separation or its converse, the electrical coupling between the conductive material comprising adjacent aperture zones, may be varied so as to reduce the differences in the surface densities of the electrostatic charges on the portions of adjacent zones in the immediate region of the zone boundary. The electrical separation can be controlled in a number of ways, such as for example, changing the amount of cross-talk between adjacent zones by varying the conductivity of the atmosphere, varying the width of the non-conductive regions between adjacent conducting regions, or varying the dielectric properties of the supporting film.

Figure 5:
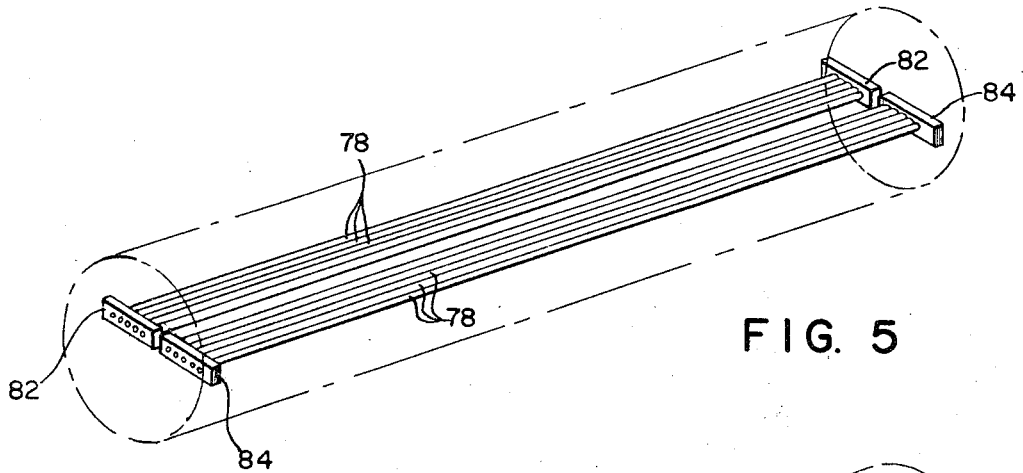
FIGS. 5 and 6 are views similar to FIGS. 2 and 3 illustrating another embodiment of the invention in different operative positions thereof.
Figure 6:
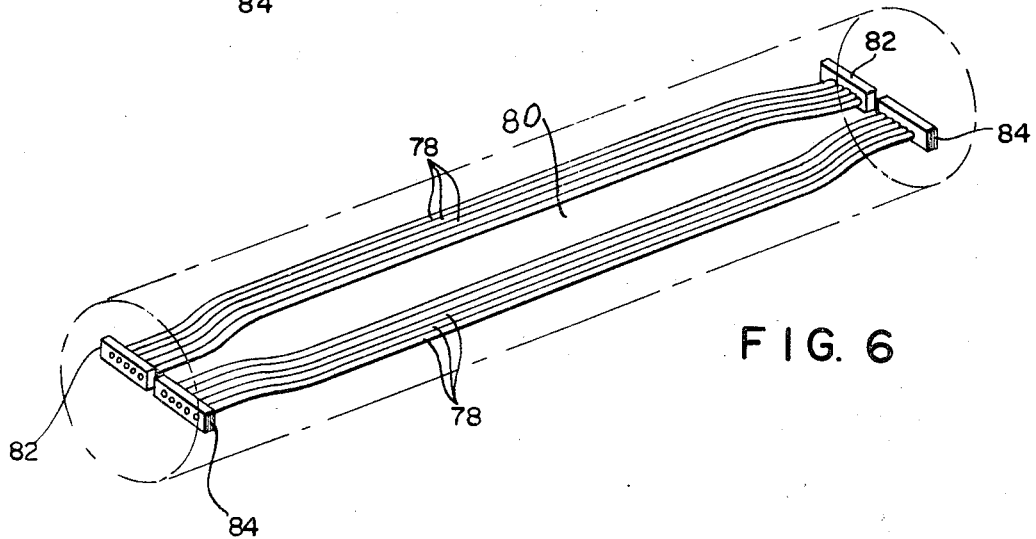

Another embodiment of a transducer useful in the aperture control system of the invention is illustrated in FIGS. 5 and 6. This transducer includes a tube similar in construction to tube 42 and providing a similar atmosphere, and means mounted within the tube for providing an aperture, comprising a multiplicity of fine filaments 78 formed of an electrically non-conductive material such as quartz or polytetrafluoroethylene, capable of holding an electrostatic charge and having substantial mechanical strength and stability. Filaments 78 are supported at their ends in tension in side-by-side contiguous relation and are arranged in two adjacent groups defining the sides of an aperture designated 80. One group of filaments 78 is supported at its ends on electrodes 82 and the other group of filaments 78 is supported at its ends on electrodes 84, the electrodes in turn being mounted on the ends of the tube providing the atmosphere in which the transducer functions. The photoresponsive control circuit for the transducer shown in FIGS. 5 and 6 is substantially the same as shown in FIG. 4 and is coupled with the two groups of filaments to produce charges of the same sign on the two groups of filaments and thereby vary the width of aperture 80 defined thereby. The response time of this transducer is a function of the tension on filaments 78 and the rate of change of charge thereon, and the width of the aperture is varied uniformly throughout the major portion of the length of the filaments, although because of nature of the aperture, some tapering occurs at the ends. However, this will have little effect if only the portion of the aperture which is of uniform width is utilized to control exposure of the recording medium.

It will be seen from the foregoing that the present invention provides an exposure control system including a variable width shutter aperture having a very short response time and a photoresponsive system for controlling the width of the aperture to provide for reduction of the variations in light energy transmitted by the aperture.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. In a camera including means for effecting relative motion of a light-sensitive image-recording medium and an aperture located near said medium to expose said image-recording medium for a duration that is a function of the width of said aperture, means providing a variable width aperture having a short response time comprising, in combination:
- a light-transmitting envelope enclosing an atmosphere of predetermined composition and density;
- a pair of thin, light-opaque, resilient membranes including longitudinal edge sections mounted within said envelope with said edge sections located in spaced face-to-face relation to define therebetween a relatively narrow, elongated aperture;
- means for producing electrostatic charges on said membranes; and
- control means for rapidly changing the surface density of said electrostatic charges to vary the width of said aperture defined by said sections of said membranes during exposure of an image-recording medium to light transmitted by said aperture.

2. A camera as defined in claim 1 wherein said control means include means for sensing the intensity of light incident on said aperture during exposure of an image-recording medium by light transmitted through said aperture and immediately varying the surface density of the electrostatic charges on said membranes as a function of the intensity of said incident light to change the width of said aperture in inverse relation to said intenstiy of said incident light.

3. A camera as defined in claim 2 wherein the last-mentioned means include a photoresponsive resistor.

4. A camera as defined in claim 1 wherein said control means include means for producing electrostatic charges of the same size on juxtaposed portions of said edge sections and light-responsive electrical means for sensing the intensity of light incident on said aperture during exposure of image-recording medium by light transmitted through said aperture and immediately varying the surface density of said electrostatic charges on said membranes in inverse relation to the intensity of said incident light.

5. A camera as defined in claim 1 wherein at least said edge sections of each of said membranes is divided transversely into a plurality of contiguous zones electrically insulated from one another, means are provided for producing electrostatic charges on each of said zones; and said control means includes means for varying the surface density of said electrostatic charges on each of said zones of each of said membranes independently of the surface density of the charges on contiguous zones of said each membrane.

6. A camera as defined in claim 5 wherein each pair of juxtaposed zones of said membranes define a zone of said aperture and said control means include means for sensing the intensity of light incident on each of said zones of said aperture and during exposure of an image-recording medium to light transmitted by said aperture continuously varying the surface density of the electrostatic charges on said zones of said membranes defining said each aperture as a function of the intensity of light incident on said each zone to vary the width of said each zone in inverse relation to the intensity of said light incident thereon.

References Cited

UNITED STATES PATENTS

| | | | |
|---|---|---|---|
| 3,116,670 | 1/1964 | Ball | |
| 3,324,777 | 6/1967 | Kanner | 95—12.5 XR |

NORTON ANSHER, *Primary Examiner.*

J. F. PETERS, JR., *Assistant Examiner.*

U.S. Cl. X.R.

95—10; 250—229; 350—272